United States Patent [19]

Succi

[11] Patent Number: 5,217,349

[45] Date of Patent: Jun. 8, 1993

[54] SYSTEM AND METHOD FOR SUPPRESSING NOISE PRODUCED BY ROTORS

[75] Inventor: George P. Succi, Cambridge, Mass.

[73] Assignee: Technology Integration Incorporated, Bedford, Mass.

[21] Appl. No.: 401,059

[22] Filed: Aug. 31, 1989

[51] Int. Cl.$^5$ .............................. F03B 11/04
[52] U.S. Cl. ........................ 415/119; 416/91; 416/223 R; 416/228
[58] Field of Search .............. 415/119, 115; 416/95, 416/96 R, 96 A, 90 R, 90 A, 93 R, 94, 223 R, 228, 236 R, 236 A, 91; 244/35 R, 1 N, 12.6, 209, 123

[56] References Cited

U.S. PATENT DOCUMENTS

| | | | |
|---|---|---|---|
| 2,584,198 | 2/1952 | Griffith | 244/1 N |
| 3,166,129 | 1/1965 | Bryan | 416/236 R |
| 3,314,629 | 4/1967 | Rethorst | 244/1 N |
| 3,576,300 | 4/1971 | Palfreyman | 249/1 N |
| 3,612,446 | 10/1971 | Lebert | 244/1 N |
| 3,647,160 | 3/1972 | Alperin | 244/1 N |
| 3,705,700 | 12/1972 | Custer | 249/12.6 |
| 3,776,489 | 12/1973 | Wen et al. | 244/1 N |
| 3,794,274 | 2/1974 | Eknes | 244/1 N |
| 4,036,452 | 7/1977 | Schairer | 244/1 N |
| 4,114,836 | 9/1978 | Graham et al. | 244/1 N |
| 4,188,906 | 2/1980 | Tachmindji et al. | 416/90 A |
| 4,243,188 | 1/1981 | DeBlois | 244/1 N |
| 4,655,685 | 4/1987 | Fradenburgh | 416/90 A |
| 4,722,608 | 2/1988 | Salzman et al. | 416/228 |

FOREIGN PATENT DOCUMENTS

| | | | |
|---|---|---|---|
| 817236 | 8/1937 | France | 416/91 |
| 495838 | 11/1938 | United Kingdom | 416/91 |

*Primary Examiner*—Edward K. Look
*Assistant Examiner*—Hoang Nguyen
*Attorney, Agent, or Firm*—Michael J. Bevilacqua

[57] ABSTRACT

Disclosed is a system and method for suppressing rotor noise by distributing mass and momentum sources and sinks on the rotor blade. A source is located on the blade, and therefore has the directivity of moving, as opposed to a stationary source. Moreover, the motion of the blade with respect to the observer amplifies the sound from the source in a manner similar to the manner in which motion of the blade amplifies all other sources of noise associated with the rotating blade. Two sources can be used to cancel noise. The first source, created by ejecting air from or drawing air into the blade, is used to cancel the "load" portion of rotor noise. The second source, created by developing a radial force with a proplet, is used to cancel the "thickness" portion of rotor noise. More control can be achieved by time modulating the rate of suction or the amplitude of radial force developed by said proplet.

16 Claims, 7 Drawing Sheets

SYSTEM AND METHOD FOR SUPPRESSING NOISE PRODUCED BY ROTORS

BACKGROUND OF THE INVENTION

The present invention relates to a system and method for suppressing noise and more particularly to a system and method for suppressing noise produced by high-speed rotors of aircraft through the distribution of sources on the rotor blade and/or by developing a radial force.

Noise generated by aircraft is a problem for both the passengers in the aircraft as well as the community over which the aircraft flies. One source of noise which is often dominant is the noise due to rotors. In a helicopter, there are two such rotors: the main rotor and the tail rotor. In transport aircraft, the source of noise is the propeller.

The noise produced by rotors comes about by virtue of the movement of the blade through the air. Traditionally, the noise sources have been subdivided into three categories: loading, thickness, and quadrupole noise. Loading noise results from the lift and drag forces the rotor exerts on the air. If the forces on the air vary with time, then the noise is called unsteady loading noise. Thickness noise is produced by displacement of the air due to the finite volume of the rotor blade. Quadrupole noise is due to strong gradients in the fluid near the rotor blade surface. Quadrupole noise as used herein is a generic term which includes the noise from shocks, the Reynolds stresses, the boundary layer, and the trailing vortex sheet. For sound to be radiated from a rotor, it is not necessary for the magnitude of these sources to vary with time (in blade-fixed coordinates). The noise itself results from the rapidly changing position of the blade (volume, forces and quadrupoles) with respect to the observer. This effect determines both the time-dependence and amplitude of the noise generated. For subsonic motion, both the amplitude and directionality are proportional to $(1-M_r)^{-n}$, where $M_r$ is the Mach-number at which the source approaches the observer and n is a positive number. The factor n influences the amplitude at which the blade radiates sound due to its motion.

Several techniques have been used to reduce rotor noise. Most of these techniques have concentrated on changing the source characteristics of the noise. One such method discovered by H. Hubbard (see H. H. Hubbard, "Propeller-noise Charts for Transport Airplanes," N.A.C.A. TN 2968 (1953), and H. H. Hubbard and L. N. Lassiter, "Sound from a Two Blade Propeller at Supersonic Tip Speeds," N.A.C.A. Rep., 1079 (1952)), involves the reduction of the tip speed. The amplitude of radiated noise becomes very large for points on the blade, where $M_r \sim 1$, and Hubbard's method reduces noise by reducing the maximum value that $M_r$ can attain. $M_r$ is the velocity of the blade divided by the speed of sound in the direction from a point on the blade to the observer. The maximum velocity on the blade is at the tip. Thus, by reducing tip velocity, the maximum possible value of $M_r$ is reduced.

Another method for reducing rotor noise which was first proposed by D. Bliss (see U.S. Pat. No. 3,989,406, Bliss, D. B., "Method of and Apparatus for Preventing Leading Edge Shocks and Shock-Related Noise in Transonic and Supersonic Blades and the Like") involves the sweeping of the blades. Normally, rotor blades are made by stacking the aeordynamic centers of the blade sections along a straight radial line. To sweep a blade means to stack the blade sections along a curved arc. This arc can be located in a plane of rotation called in-plane sweep, or on a helical surface. Initially, this method was used with ducted fan blades, but it has been utilized with unducted rotors as well. The sweep of the blades reduces the shock formed on the blade, and thereby reduces the source strength. At a later date, Hanson discovered that unducted swept blades show reduced noise by virtue of another effect. First, approximately all points on a straight (radial) blade attain their maximum value of $M_r$ at the same retarded time. The term "retarded time" describes the time at which the blade emitted the sound. If the blade is swept, the points attain their maximum value of $M_r$ at different retarded times. Hanson (see D. B. Hanson," The Influence of Propeller Design Parameters on Far Field Harmonic Noise in Forward Flight", 1979 American Institute of Aeronautics and Astronautics Paper 79-0609 and D. B. Hanson, "Study of Subsonic Fan Noise Sources", 1975 American Institute of Aeronautics and Astronautics Paper 75-468 recognized that sweeping the blade is equivalent to shifting the phase of the sound wave emitted by each such point on the blade.

Another method for reducing noise, proposed by Succi, (see "Design of Quiet Efficient Propellers", SAE paper 790584, Business Aircraft Meeting, April, 1979) involves the changing of the number of blades. At any instant, there is only one blade that approaches the observer at its fastest rate, and it is this blade that is the greatest noise source. By reducing the strength of the source, by distributing the loading and thickness over a greater number of blades, noise is reduced.

"Tip mass injection" has been proposed by R. White (see Pegg, R. J., "Insights into the Nature and Control of Rotor Noise," NASA Conference on Aircraft Safety and Operational Problems, NASA SP416) for reducing helicopter rotor noise. This noise is related to the interaction of the main rotor blade with its wake, and is known as blade/vortex interaction noise. White proposed injecting air into the tip vortex to change the character of the tip vortex and thereby change the blade/vortex interaction noise.

Despite all of these attempted solutions, no known system satisfactorily reduces helicopter rotor noise.

It is therefore a principal object of the present invention to provide a system and method for suppressing aircraft rotor noise more effectively than known systems and methods.

Still another object of the present invention is to provide a system and method for suppressing aircraft rotor noise by separately cancelling rotor loading and thickness noise by using mass suction and/or radial forces.

SUMMARY OF THE INVENTION

Accordingly, the system and method of the present invention suppresses rotor noise by distributing mass sources on the rotor blade. These sources are two distinctly different types. The first source is a fluid mass source or sink. Such a source is implemented by exhausting (or drawing) air from a port on the rotor. In the simplest implementation, the port is located at the tip of the blade. More generally, the sources can be distributed at different points on the blade. The second source is a radial force. Such a source is implemented by placing a blade element, called a proplet, on the rotor blade so as to develop a force in the radial direction. In the simplest implementation, it can be done by having the blade element perpendicular to the rotor blade at the tips. More generally, such blade elements can be distributed at different points on the blade and at different angles of inclination. It is the combination of these two sources that provides significant noise reduction. The mass injection source is used to cancel loading noise; the radial force is used to cancel thickness noise.

In the described embodiments the source is located on the blade and therefore has the directivity of a moving, as opposed to a stationary, source. Moreover, the motion of the blade with respect to the observer amplifies the sound from the source in a manner similar to the manner in which motion of the blade amplifies all other sources of noise associated with the rotating blade. The source can be created by ejecting air from or drawing air into the blade. In the simplest form of the invention, the mass is introduced or removed at a constant rate. More control can be achieved, if needed, by modulating the rate of injection.

These and other features and objects of the present invention will be more fully understood from the following detailed description which should be read in light of the accompanying drawings in which corresponding reference numerals refer to corresponding parts throughout the several views.

BRIEF DESCRIPTION OF THE DRAWINGS

FIG. 2b is a simplified view of an alternate embodiment of the rotor blade shown in FIG. 2a;

FIG. 2c is a simplified view of another alternate embodiment of the rotor blade shown in FIG. 2a;

DETAILED DESCRIPTION OF THE PREFERRED EMBODIMENTS

Figure 1A:
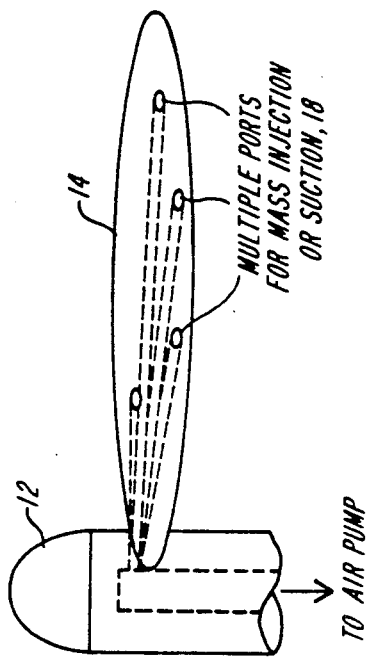
FIG. 1a is a simplified view of one rotor blade of the system and method of the present invention for suppressing rotor noise.

The system and method of the present invention operates on the principle of cancelling sound by sound. The noise radiated by the rotating blade is cancelled by the addition of the noise radiated by rotating mass injection/suction devices or by a radial force. To simplify the terminology, the term "mass injection" will be used herein to cover both the cases of ejecting air from the blade or drawing air into the blade.

To accomplish the noise reduction, sources are located on a rotating blade and thus have a directivity and amplitude similar to all other blade sources. This similarity is due to the factor $(1-M_r)^{-n}$ which appears in the expression for noise radiated by the mass source. To clarify this statement, the expression for pressure $P(x,t)$ detected by an observer at position x and time t is as follows:

$$P(x, t) = \sum_i P_{li} + P_{ti} + \text{Quadrupole Noise} \quad (1)$$

$$Pl_k = \frac{1}{c} \frac{\partial}{\partial t}\left(\frac{r_i L_i}{r(1-M_r)}\right) + \left(\frac{r_i L_i}{r^2(1-M_r)}\right) \quad (2)$$

$$4\pi P_{ti} = \frac{\partial^2}{\partial t^2} \frac{\rho_0 \psi_i}{r|1-M_r|} \quad (3a)$$

$$= \psi_i \frac{\partial^2}{\partial t^2} \frac{\rho_0}{r|1-M_r|} + 2\frac{\partial}{\partial t} \frac{(\rho_0)}{(r|1-M_r|)} \frac{\partial}{\partial t} \psi_i + \frac{\rho_0}{r|1-M_r|} \frac{\partial^2}{\partial t^2} \psi_i^2 \quad (3b)$$

$$\frac{\partial}{\partial t} = \frac{1}{(1-M_r)} \frac{\partial}{\partial \tau} \quad (4)$$

Equation (1) states that the pressure p is due to the sum of all loading ($P_l$) and thickness ($P_t$) sources on the blade. In this expression, we assume that the blade is subdivided into many small pieces and that each piece is treated as a point noise source due to the forces (L) and volume ($\psi$) occupied by the subdivision. For all points, except for $M_r \sim 1$, one can use equations 1 to 4 for the sound radiated by such a point. Here r represents the distance between the source and observer, t the time observer detects the sound, and $\tau$ the time the source emits the sound. Successive differentiation with respect to time generates the factors $(1-M_r)^{-n}$ which determine the directivity. Note that $M_r$ depends on both the motion of the source and the position of the observer. Consider, for example a hovering rotor. If the observer is on the axis of rotation, then $M_r=0$ because the blades are neither approaching nor receding from the observer. If the observer is in the disk plane, then Mr varies periodically in time as the blade approaches and recedes from the observer.

The use of mass injection will be discussed first. The principle of mass injection is to create a new source on the blade. Because the source is on the blade, it has a directivity pattern and amplitude similar to other moving points on the blade. The sound associated with mass injection or suction can be described as a variable or suction thickness source. The "load" comes from the transfer of momentum to the surrounding air. The "thickness" comes from the new mass added or subtracted to the surrounding air. Inspection of Equation (3b) shows that "thickness" noise is proportional to $$\psi, \frac{\partial \psi}{\partial t}, \frac{\partial^2 \psi}{\partial t^2}$$

The term proportional to the volume ($\psi$) is associated with rotor thickness noise. The next two terms are due to mass injection ($d\psi/dt$) and the time rate of change of mass injection ($d^2\psi/dt^2$).

Figure 1B:
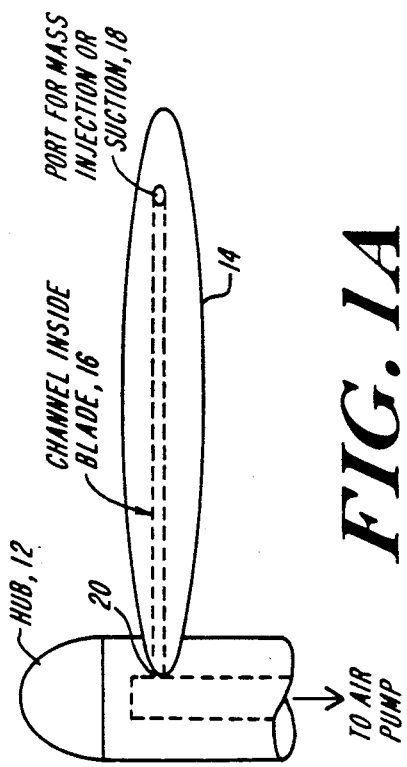
FIG. 1b is a simplified view of an alternate embodiment of the system and method of FIG. 1a for supressing noise produced by rotors.

One embodiment of the present invention utilizing mass injection to cancel the sound emitted by a blade includes a rotor blade 14 having a channel 16 completely housed within the rotor blade for drawing or pumping air through the blade 14. The channel 16 is terminated on the blade surface by a port 18 through which air is pumped or drawn. The channel 16 is terminated on its other end at the blade/hub intersection 20, where it is connected to a pump (not shown). In the simplest implementation shown in FIG. 1a, a single channel is used for each blade with an exit hole near the blade tip. In an alternate embodiment shown in FIG. 1b the rotor blade includes many channels connecting air ports on different portions of the blade. Alternatively, the rate at which air is pumped or drawn through the blade by modulation at the pump or at each port may be changed by valves.

Figure 1C:
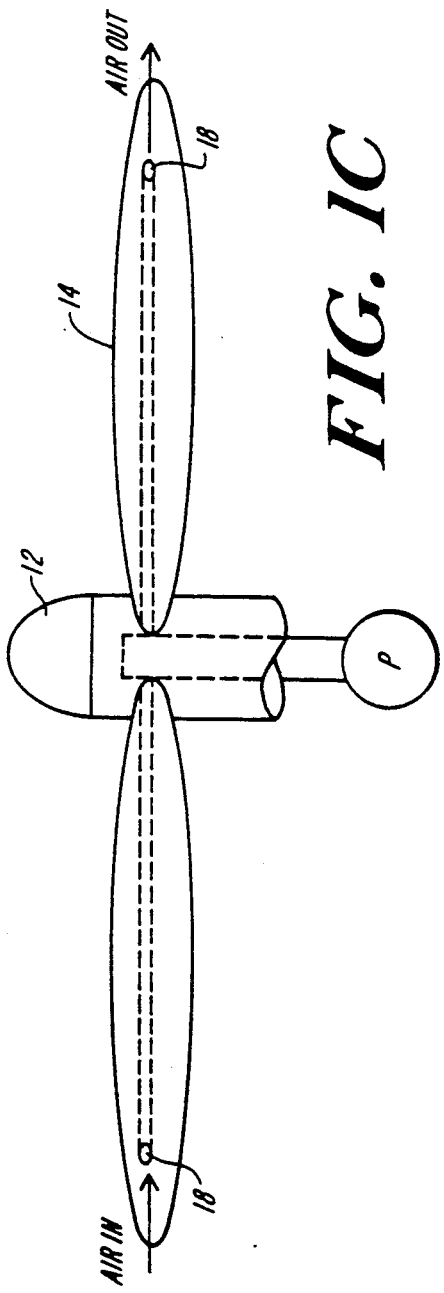
FIG. 1c is a further alternate embodiment of the system and method of FIG. 1a for supressing noise produced by rotors.

In certain rotor applications, such as the main rotor on a helicopter, the channel through which air is drawn can be connected to a companion channel through which air is pumped by pump 22 (FIG. 1c). By connecting channels in pairs, it is possible to minimize the energy expended in drawing air into the blade against the pressure gradient set up by the centrifugal forces.

Figure 2A:
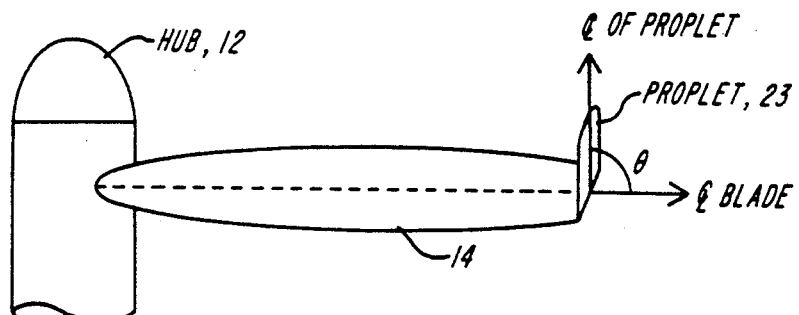
FIG. 2a is a simplified view of an alternate embodiment of a rotor blade of the present invention which includes a proplet for generating a radial force.
Figure 2B:
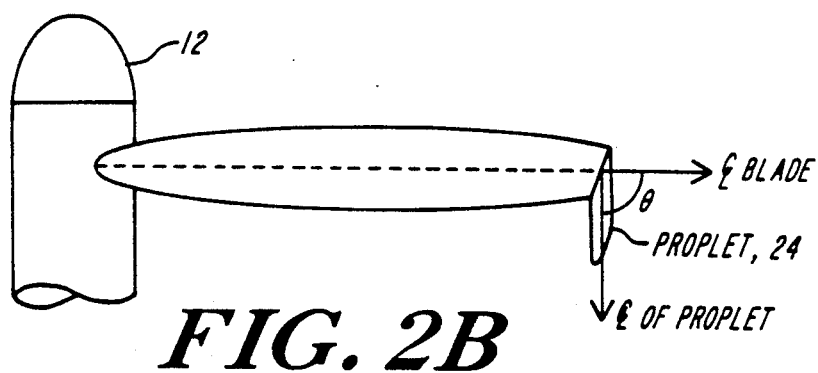
Figure 2C:
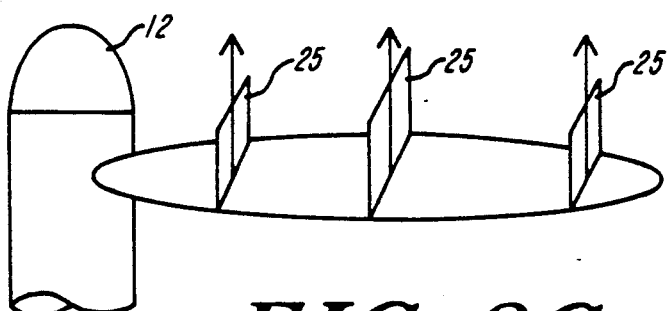

An alternate embodiment of the present invention shown in FIG. 2 utilizes proplets for creating a radial force and includes a rotor blade 14, having a proplet 23 located at the tip of the blade. The proplet is constructed so that the center line of the proplet is at an angle to the center line of the blade. For purposes of this description, the center line is defined as the line joining the aerodynamic centers of blade sections. Note that the proplet center line is at an angle $\theta$ to the blade center line. This angle is normally set at 90°. In the alternate embodiment shown in FIG. 2b, this angle is set at $-90°$. An array of proplets 25 can also be used to distribute the radial loads as shown in FIG. 2c.

Figure 3:
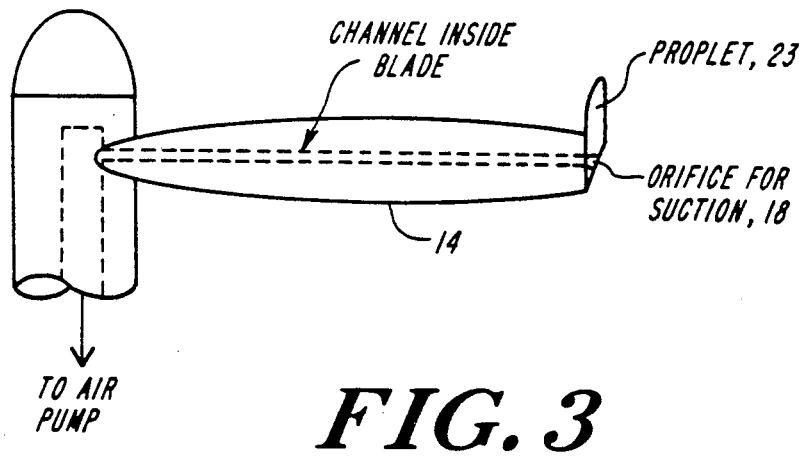
FIG. 3 is a simplified view of another alternate embodiment of a rotor blade of the present invention, which includes a proplet and an orifice and channel.

A preferred embodiment of the invention is illustrated in FIG. 3. In this embodiment, both an orifice 18 for mass suction and a proplet 23 for radial force are located on the blade 14. The mass suction source is used principally to cancel rotor loading noise due to the drag dipole. The radial force developed by the proplet 23 is used to cancel the thickness noise of the rotor.

In order to illustrate the mass injection/suction, the "thickness" effects of such mass injection will now be described. The "thickness"-like aspect can be used to cancel the "drag dipole" of a portion of the loading noise of a rotor. The radial load due to a proplet must be used to cancel the thickness noise. This load will be caused by injecting momentum in the radial direction so as not to alter the "drag" or "thrust" components of the rotor.

Figure 4:
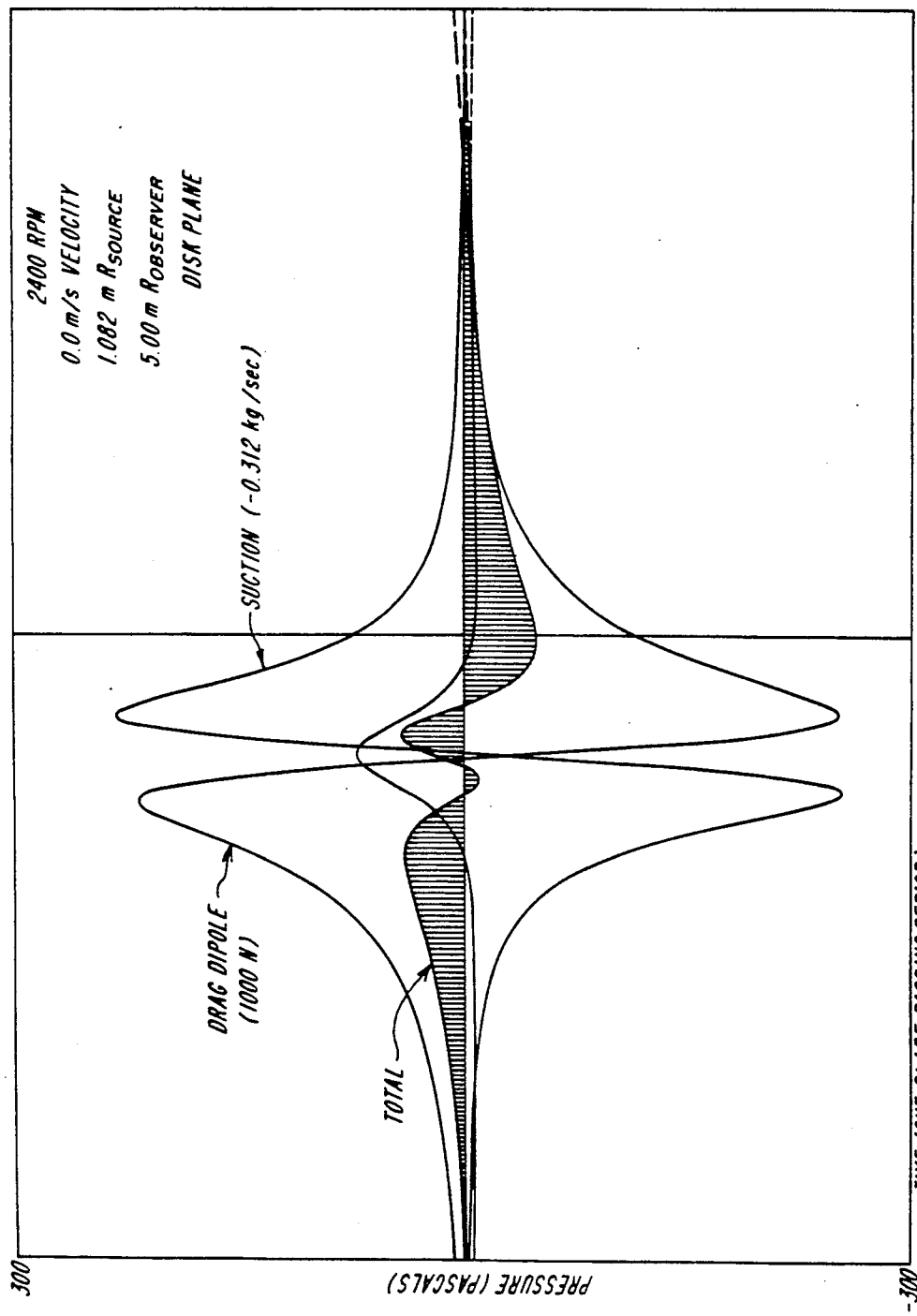
FIG. 4 is a graph illustrating the cancellation effect of the loading noise with the observer located in the disk plane 5m from the center.

Referring to FIG. 4, the following example illustrates the cancellation effect of the on-blade mass suction. The parameters for this example are as follows: the sound is radiated a single point force rotating at 2400 RPM; the source is 1.082 meters from the center of rotation and has a strength of 1000 Newtons directed opposite from its angular velocity; the observer is located in the disk plane 5 meters from the center and there is no forward motion. One can cancel the sound from this "drag dipole" by drawing air into the blade at a rate of 0.312 kg/sec. The sound from the "drag dipole" is almost completely cancelled. (Recall, that in the disk plane, the drag dipole dominates the loading noise.)

Figure 5:
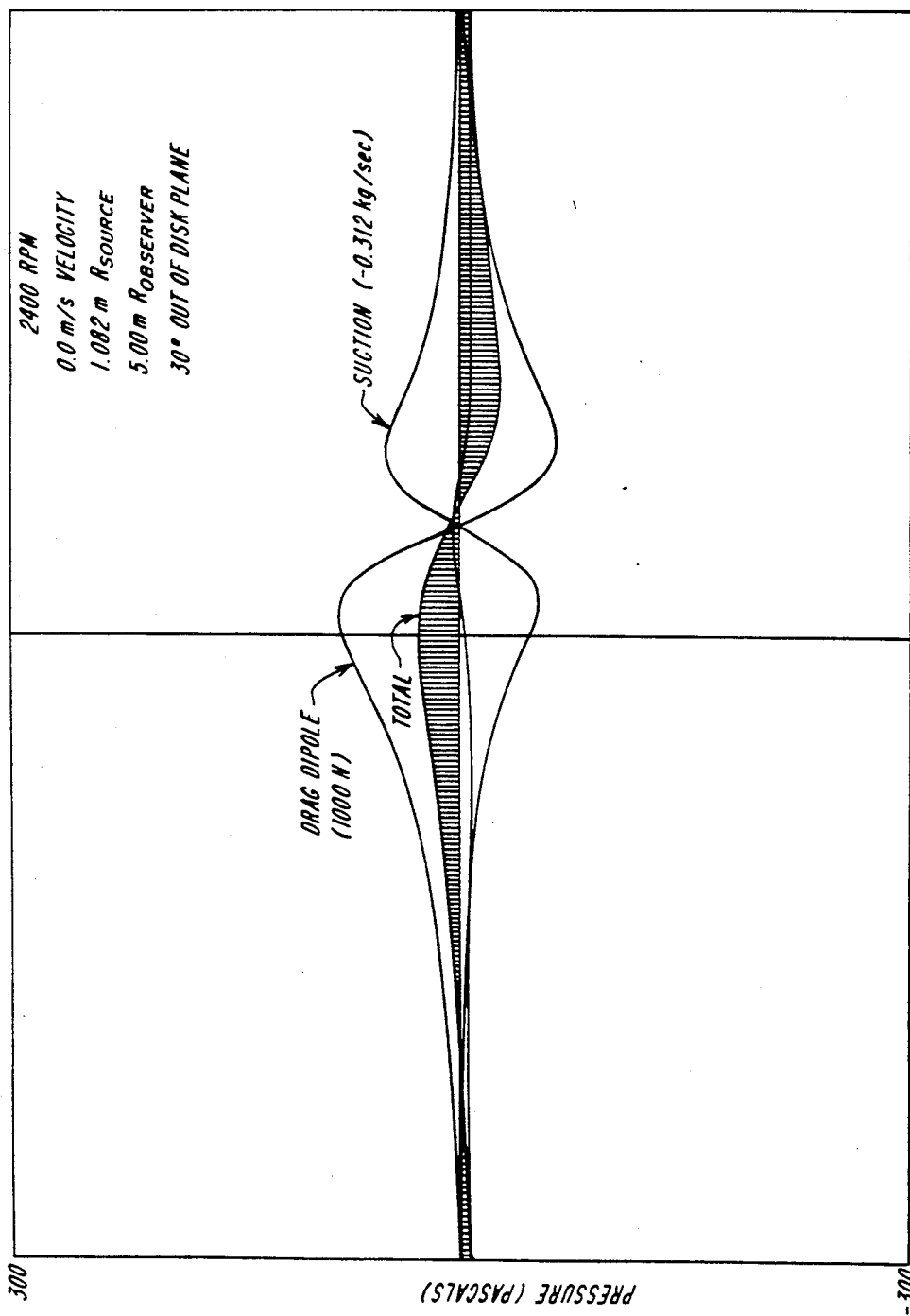
FIG. 5 is a graph showing the cancellation effect under the same conditions as FIG. 4 with the observer located 30° forward of the disk plane.

Referring to the example of FIG. 5, the observer is now 30° below the disk plane with the source field remaining the same. Both the force term and the mass injection term are reduced in amplitude because the term $M_r$ is reduced by the same amount for each source. The details of the directivity pattern will differ because the description of sound radiation by a moving force is governed by a different equation than sound radiation from a mass sink. Nonetheless, the leading term is due to the factor $(1-M_r)^{-n}$, which is the same for both sources. Thus, because the source used to cancel the rotor noise moves at the same rate as the rotor noise source, the directivity patterns are substantially the same.

The "load" portion due to proplets will now be considered by illustrating the effect of the momentum transfer in the radial direction. In other words, rotor noise may be suppressed by distributing a radial force along the blade. Again, the source is located on the blade, and therefore, its directivity is dominated by the motion of the blade. In the simplest method, the radial force is constant, but dynamic (time-varying) control can be achieved by altering the radial force.

Figure 6:
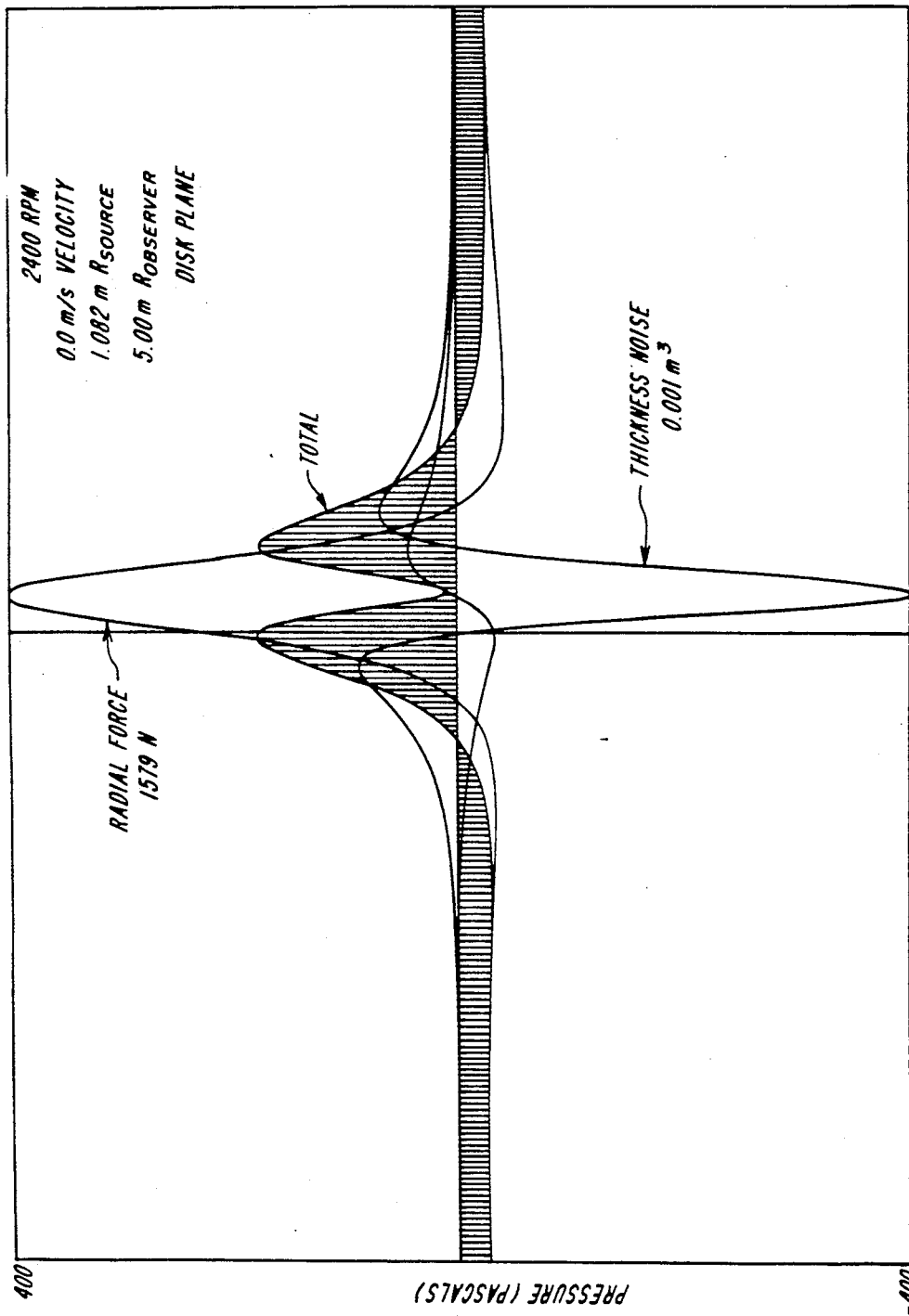
FIG. 6 is a graph showing the reduction in thickness noise achieved by the system and method of the present invention with the observer located 5 m from the center.
Figure 7:
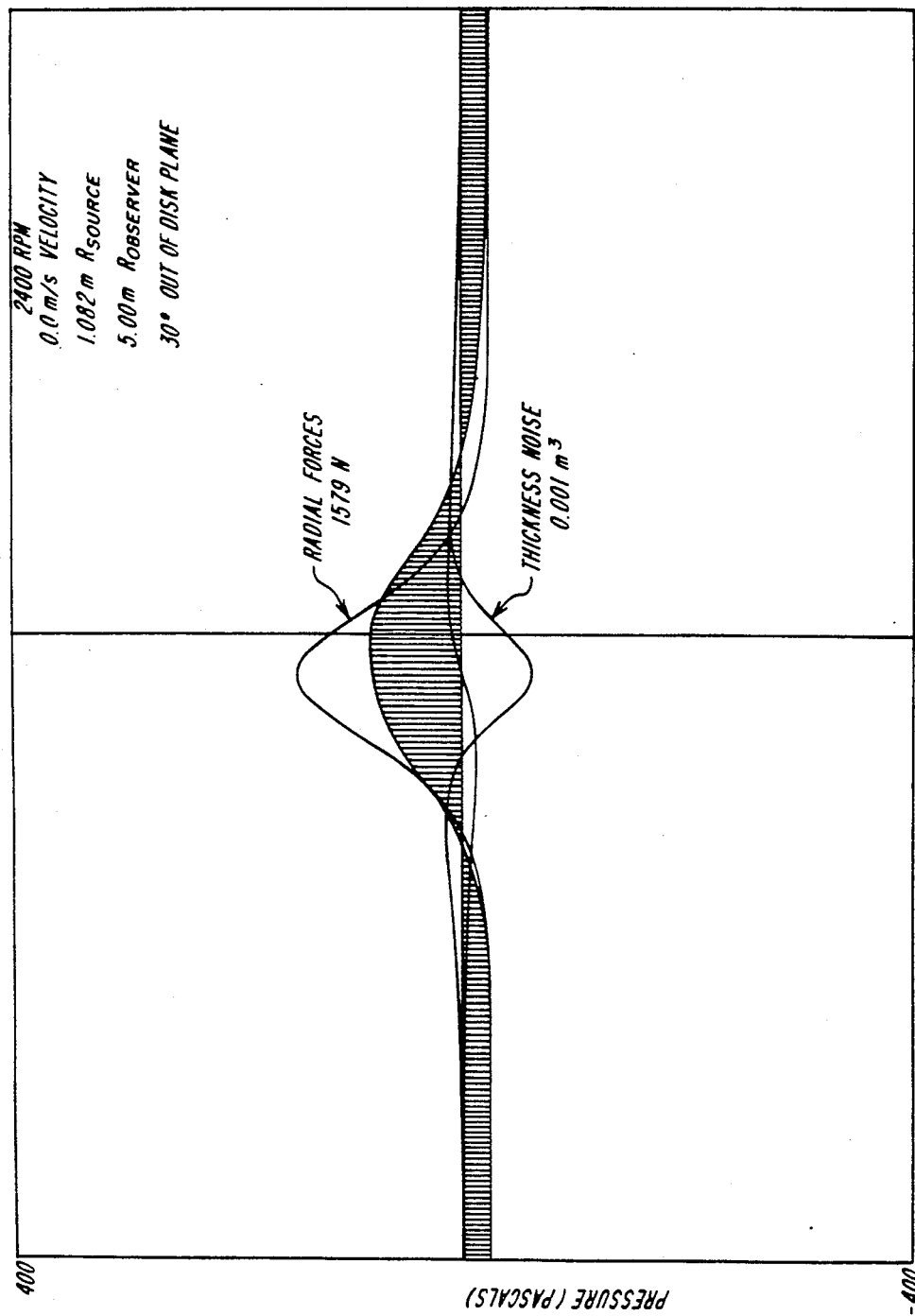
FIG. 7 is a graph similar to the graph of FIG. 6 with the observer located 30° out of the disk plane.

In the example shown in FIG. 6, the sound is radiated by a simple point volume rotating at 2400 RPM, with the source located 1.052 meters from the center of rotation and having a volume of 0.001 cubic meters. The observer is located 5 meters from the center. To cancel the sound from this volume, one would create a radial force (directed outwardly) of strength 1579N. The negative pressure peak of this thickness noise is almost completely canceled. In FIG. 7, the same calculation is performed with the observer located 30° below the disk plane. Again, each source is reduced in such a way so as to maintain sound cancellation. Note that the proplets 24 are used to cancel thickness noise, and suction is used to cancel loading noise.

While the foregoing invention has been described with reference to its preferred embodiments, various alterations and modifications will occur to those skilled in the art. All such variations and alterations are intended to fall within the scope of the appended claims.

What is claimed is:

1. A system for suppressing noise produced by a rotor including at least one rotor blade, said system comprising:
   a channel extending through at least one of said rotor blades from a rotor hub to a port at a surface of the rotor blade;
   means for causing a quantity of fluid to flow into said port and then into said channel from the exterior of said blade,
   means for adjusting said quantity of fluid so that said fluid is of a magnitude sufficient to cancel rotor loading noise due to drag dipole.

2. The system for suppressing noise produced by a rotor of claim 1 further comprising means attached to said rotor blade for creating a radial force to cancel thickness noise.

3. The system for suppressing noise produced by a rotor of claim 1 wherein said means for causing a fluid to flow is connected to said rotor hub to draw or pump the fluid into a hub channel in said rotor hub from said channel extending within said rotor blade.

4. The system for suppressing noise produced by a rotor of claim 1 further comprising:

a plurality of channels extending through said rotor blade from a rotor hub to one of a plurality of ports at said surface of the rotor blade.

5. The system for suppressing noise produced by a rotor of claim 1 wherein said rotor includes at least two rotor blades, with one blade positioned on one side of said rotor hub and another blade positioned on an opposite side of said rotor hub, said system further comprising a second channel extending through said another blade, and a hub channel connecting said channels in said one blade and in said another blade.

6. The system for suppressing noise produced by a rotor of claim 2 wherein said means for creating a radial force comprises at least one proplet attached to said rotor blade and extending in a substantially perpendicular direction from said rotor blade.

7. A system for suppressing noise produced by a rotor including at least one rotor blade, said system comprising means attached to said rotor blade for creating a radial force on said rotor blade during the entire rotation of the blade, said means for creating a radial force being adjustable to create a force of an optimized magnitude and direction to cancel thickness noise.

8. The system for suppressing nose produced by a rotor of claim 7 wherein said means for creating a radial force comprises at least one proplet attached to said rotor blade and extending in a substantially perpendicular direction from said rotor blade, said proplet being positioned to create a radial force on said rotor blade during the entire rotation of the blade.

9. The system for suppressing noise produced by a rotor of claim 6 further comprising means to control a position of said proplet in order to produce a time-dependent radial force on said rotor blade, said radial force being of a magnitude and direction optimized to cancel thickness noise.

10. A method for suppressing noise produced by a rotor including at least one rotor blade, said method comprising the steps of:

providing a channel extending through at least one of said rotor blades from a rotor hub to a port at a surface of the rotor blade;

providing means for causing a fluid to flow into said port and said channel from the exterior of said blade;

causing a quantity of fluid to flow into said port from the exterior of said blade, said quantity of fluid being constantly adjusted to have a magnitude sufficient to substantially cancel at least one component of the noise created by the rotor.

11. The method for suppressing noise produced by a rotor of claim 10 further comprising the step of creating a radial force to cancel thickness noise created by the displacement of fluid due to the finite volume of the rotor blade.

12. The method for suppressing noise produced by a rotor of claim 10 wherein said means for allowing a fluid to flow through said channel and port is connected to said rotor hub to cause fluid to flow into a hub channel in said rotor hub and through said channel extending within said rotor blade.

13. The method for suppressing noise produced by a rotor of claim 10 wherein a plurality of channels extend through said rotor blade from a rotor hub to one of a plurality of ports at said surface of the rotor blade.

14. The method for suppressing noise produced by a rotor of claim 10 wherein said rotor includes at least two rotor blades, with one blade positioned on one side of said rotor hub and another blade positioned on an opposite side of said rotor hub with a second channel extending through said another blade, and a hub channel connecting said channels in said one blade and in said another blade.

15. The method for suppressing noise produced by a rotor of 11 wherein said step of creating a radial force comprises the step of attaching at least one proplet to said rotor blade.

16. The method of suppressing noise produced by a rotor of claim 15 further comprising the step of controlling a position of said proplet in order to adjust a magnitude and direction of a time-dependent radial force on said rotor blade so that said magnitude and direction are optimized to cancel thickness noise.

* * * * *